United States Patent Office 3,808,257
Patented Apr. 30, 1974

3,808,257
N-CYANOALKYL-N-CYCLOALKYL-N-PHENOXY-ALKYL AMINES
Sidney B. Richter, Chicago, and Alfred A. Levin, Skokie, Ill., assignors to Velsicol Chemical Corporation, Chicago, Ill.
No Drawing. Filed Oct. 28, 1971, Ser. No. 193,556
Int. Cl. C07c 121/78
U.S. Cl. 260—465 E     3 Claims

ABSTRACT OF THE DISCLOSURE

This invention discloses new compounds of the formula

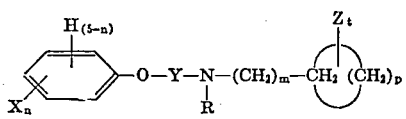

wherein X is selected from the group consisting of alkyl, halogen, haloalkyl, alkoxy, alkylthio, and nitro; $n$ is an integer from 0 to 4; Y is an alkylene group of from 1 to 5 carbon atoms; R is selected from the group consisting of monohydroxyalkyl and monocyanoalkyl; $m$ is an integer from 0 to 3; Z is selected from the group consisting of alkyl and halogen; $t$ is an integer from 0 to 2; and $p$ is an integer from 4 to 11. The compounds of the above description are useful as aquatic herbicides.

---

This invention relates to new compositions of matter. More particularly, this invention relates to new chemical compounds of the formula

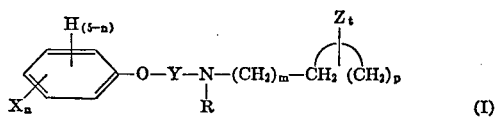

wherein X is selected from the group consisting of alkyl, halogen, haloalkyl, alkoxy, alkylthio and nitro; $n$ is an integer from 0 to 4; Y is an alkylene group of from 1 to 5 carbon atoms; R is selected from the group consisting of monohydroxyalkyl and monocyanoalkyl; $m$ is an integer from 0 to 3; Z is selected from the group consisting of alkyl and halogen; $t$ is an integer from 0 to 2; and $p$ is an integer from 4 to 11.

In a preferred embodiment of the present invention, X is selected from the group consisting of lower alkyl, chlorine, bromine, fluorine, lower chloroalkyl, trifluoromethyl, lower alkoxy, lower alkylthio and nitro; $n$ is an integer from 0 to 3; Y is an alkylene group of from 1 to 3 carbon atoms; R is selected from the group consisting of monohydroxy lower alkyl and monocyano lower alkyl; $m$ is an integer from 0 to 3; Z is selected from the group consisting of lower alkyl, chlorine, bormine and fluorine; $t$ is 0 or 1; and $p$ is an integer from 4 to 11.

The term lower, for the purpose of this invention, is used to designate a branched or unbranched carbon chain containing up to six carbon atoms.

The compounds of the present invention are unexpectedly useful as aquatic herbicides.

The compounds of this invention can be readily prepared from a phenoxyalkylamine of the formula

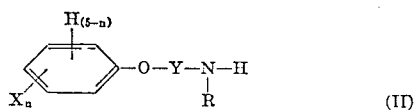

wherein X, $n$, Y and R are as heretofore described by reaction with a compound of the formula

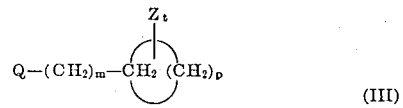

wherein Q is halogen, preferably chlorine or bromine, and $m$, Z, $t$ and $p$ are as heretofore described. This reaction can be conveniently effected by combining the reactants in an inert organic reaction medium such as benzene, toluene, or the like, in the presence of an acid acceptor such as a tertiary amine, an alkaline metal hydroxide or the like. After this reaction is completed, the reaction mixture can be filtered to remove the acid acceptor halide and the desired product can be recovered upon evaporation of the solvent used. This product can then be used as such or can be further purified by standard techniques well known in the art.

The compounds of this invention can also be prepared from a phenoxy alkyl halide of the formula

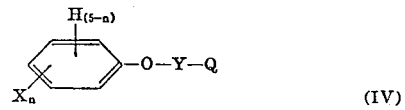

wherein X and Y are as heretofore described and Q is halogen, preferably chlorine or bromine, by reaction with a primary or secondary amine of the formula

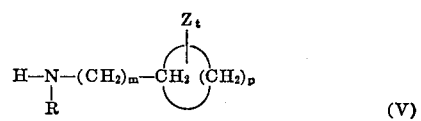

wherein R, $m$, Z, $t$ and $p$ are as heretofore described. This reaction can be effected by adding a solution of the phenoxy alkyl halide of Formula IV in an inert organic solvent such as methanol with vigorous stirring to a solution of the amine of Formula V in a similar organic solvent. After the addition is completed, the reaction mixture can be heated at reflux for a period of from about 1 to 12 hours to insure the completion of the reaction. After this time, the reaction mixture can be distilled to remove the solvent and unreacted starting amine to yield the product amine hydrohalide. The hydrohalide can then be treated with base such as sodium hydroxide to liberate the desired product as the free amine. This amine can then be dissolved in ether and washed with water, dried, filtered and upon evaporation of the ether can be used as such or can be further purified by standard methods in the art.

Exemplary phenoxyalkyl halides of Formula IV for preparing the compounds of the present invention are phenoxyethyl bromide, β-(2,4-dichlorophenoxy)ethyl bromide, β-(2,5-dichlorophenoxy)ethyl bromide, β-(2-methyl-4-chlorophenoxy)ethyl bromide, α-phenoxypropyl chloride, β-(3,4-dichlorophenoxy)ethyl bromide, β-(4-isopropylphenoxy)ethyl bromide, β-(3,4-dinitrophenoxy)ethyl bromide, β-(2-methoxy-4-chlorophenoxy)ethyl bromide, β-(3-methylthiophenoxy)ethyl bromide, β-(3,4-dibromophenoxy)ethyl bromide, β-(4-fluorophenoxy)ethyl bromide, β-(4-trifluoromethylphenoxy)ethyl bromide, β-(4-trichloromethylphenoxy)ethyl bromide and the like.

Exemplary suitable amines of Formula V for preparing the compounds of this invention are N-(cyanomethyl)-N-cyclobutylamine, N-hydroxymethyl-N-cyclopentylamine, N-(3-cyanopropyl)-N-cyclohexylamine, N-(2-hydroxyisopropyl)-N-cycloheptylamine, N-(4-hydroxybutyl)-N-cyclooctylamine, N-(3-cyanobutyl)-N-cyclononylamine, N-(5-hydroxypentyl)-N-cyclodecylamine, N-(3-cyanopentyl)-N-cycloundecylamine, N-(4-hydroxyhexyl)-N-cyclododecylamine, N-(2-cyanohexyl)-N-cyclohexylamine, N-(2 - hydroxyethyl)-N-(4-chlorocyclohexyl)amine, N-cyanomethyl-N-(4-methylcyclohexyl)amine and the like.

The preparation of the compounds of the present invention is more specifically illustrated in the following examples:

EXAMPLE 1

Preparation of N-(2-cyanoethyl)-N-cyclohexyl-N-[β-(2,4-dichlorophenoxy)ethyl]amine A mixture of β-(2,4-dichlorophenoxy)ethyl bromide (10 grams; 0.037 mol), methanol (25 ml.) and N-(2-cyanoethyl)-N-cyclohexylamine (25 ml.) was charged into a glass reaction vessel equipped with mechanical stirrer and reflux condenser. The reaction mixture was stirred and heated at reflux for a period of about eight hours. After this time, the reaction mixture was stripped of methanol and excess N-(2-cyanoethyl)-N-cyclohexylamine to yield an oily slurry. This slurry was then treated with sodium hydroxide to liberate the free amine. The mixture was extracted with ether and the ether solution was washed with water and dried over anhydrous magnesium sulfate. The dried solution was filtered and evaporated on a steam bath leaving an oil as the residue. This oil was distilled, under reduced pressure, to yield the desired product N-(2-cyanoethyl) - N - cyclohexyl-N-[β-(2,4-dichlorophenoxy)ethyl]amine as an orange oil having a boiling point of 182–185° C. at 0.33 mm. of Hg pressure and an index of refraction of 1.5423 at 25° C.

Analysis for $C_{17}H_{22}Cl_2N_2O$.—Theoretical: N, 8.21%. Found: N, 7.28%.

EXAMPLE 2

Preparation of N-(2-hydroxyethyl)-N-cyclohexyl-N-[β-(2,4-dichlorophenoxy)ethyl]amine A mixture of β-(2,4-dichlorophenoxy)ethyl bromide (10 grams; 0.037 mol), methanol (25 ml.) and N-2-hydroxyethyl)-N-cyclohexylamine (25 ml.) was charged into a glass reaction vessel equipped with a mechanical stirrer and reflux condenser. The reaction mixture was stirred and heated at reflux for a period of about eight hours. After this time, the reaction mixture was stripped of methanol and excess N-(2-hydroxyethyl)-N-cyclohexylamine to yield an oily slurry. This slurry was then treated with sodium hydroxide to liberate the free amine. The mixture was extracted with ether and the ether solution was washed with water and dried over anhydrous magnesium sulfate. The dried solution was filtered and evaporated on a steam bath leaving an oil as the residue. This oil was distilled under reduced pressure, to yield the desired product N-(2-hydroxyethyl) - N - cyclohexyl - N-[β-(2,4-dichlorophenoxy)ethyl]amine as an orange oil, having a boiling point of 194–196° C. at 0.2 mm. of Hg pressure and an index of refraction of 1.5450 at 25° C.

Analysis for $C_{16}H_{23}Cl_2NO_2$.—Theoretical: N, 4.22%. Found: N, 4.45%.

Additional compounds within the scope of the present invention can be prepared by the procedures detailed in the foregoing examples. In the following examples are given the essential starting materials for preparing the named compounds by the methods heretofore described.

EXAMPLE 3

β-(3,4-dimethylphenoxy)ethyl bromide+N-(3-hydroxypropyl) - N-cyclopentylamine=N-(3-hydroxypropyl)-N-cyclopentyl-N-[β-(3,4-dimethylphenoxy)ethyl]amine.

EXAMPLE 4

γ - (2-methoxy-3,4-dibromophenoxy)propyl bromide+ N - (4-cyanobutyl)-N(3,4-dichlorocyclohexyl(amine=N-(4 - cyanobutyl)-N-(3,4-dichlorocyclohexyl)-N-[γ-(2-methoxy-3,4-dibromophenoxy)propyl]amine.

EXAMPLE 5

δ - (3-propyl-4-nitrophenoxy)butyl bromide+N-(1-hydroxyethyl) - N - (3-propylcyclopentyl)amine=N-(1-hydroxyethyl) - N-(3-propylcyclopentyl)-N-[δ-(3-propyl-4-nitrophenoxy)butyl]amine

EXAMPLE 6

β - (2 - iodo-4-decylphenoxy)ethyl bromide+N-(4-hydroxypentyl) - N - (3,4-dichlorocyclododecyl)amine=N-(4 - hydroxypentyl)-N-(3,4-dichlorocyclododecyl)-N-[β-(2-iodo-4-decylphenoxy)ethyl]amine.

EXAMPLE 7

β-(2-nitro-3-bromoethylphenoxy)ethyl bromide+N-(2-cyanobutyl) - N-(3-hexylcyclohexyl)amine=N-(2-cyanobutyl) - N - (3-hexylcyclohexyl)-N-[β-(2-nitro-3-bromoethylphenoxy)ethyl]amine.

EXAMPLE 8

3-propoxy - 4 - pentylphenoxymethyl bromide+N-(3-cyanopropyl) - N - 4,5 - dimethylcyclopentyl)amine=N-(3-cyanopropyl) - N - 4,5 - dimethylcyclopentyl)-N-(3-propoxy-4-pentylphenoxymethyl)amine.

EXAMPLE 9

γ-(4 - trifluoromethylphenoxy)propyl bromide+N-(2-hydroxybutyl - N - (2,3-dibromocyclohexyl)amine=N-(2-hydroxybutyl)-N-(2,3 - dibromocyclohexyl)-N-[γ-(4-trifluoromethylphenoxy)propyl]amine.

EXAMPLE 10

β-(2,3-dinitrophenoxy)ethyl bromide+N-cyanomethyl-N-(2,4-diiodocyclooctyl)amine=N - cyanomethyl-N-(2,4-diiodocyclooctyl)-N-[β-(2,3 - dinitrophenoxy)ethyl]amine.

EXAMPLE 11

3-methylthiophenoxymethyl bromide+N-(2 - cyanopentyl) - N - (3,4-diethylcyclohexyl)amine=N-(2-cyanopentyl) - N - (3,4-diethylcyclohexyl) - N - (3-methylthiophenoxy)methylamine.

EXAMPLE 12

2-nitro - 3 - propylthiophenoxymethyl bromide+N-(3-hydroxypentyl) - N - (2-propylcyclodecyl)amine=N-(3-hydroxypentyl)-N-(2-propylcyclodecyl) - N - (2-nitro-3-propylthiophenoxymethyl)amine.

EXAMPLE 13

β-(3,4-dichlorophenoxy)ethyl bromide+N-(2-hydroxyethyl) - N - cyclohexylmethylamine=N-[β-(3,4-dichlorophenoxy)ethyl] - N - (2-hydroxyethyl)-N-cyclohexylmethylamine.

EXAMPLE 14

β-(2,5-dichlorophenoxy)ethyl bromide+N-(2-cyanoethyl)-N-[γ-(4 - chlorocyclohexyl)propyl]amine=N-[β-(2,5-dichlorophenoxy)ethyl] - N - (2-cyanoethyl) - N - [γ-(4-chlorocyclohexyl)propyl]amine.

For practical use as pesticides, the compounds of this invention are generally incorporated into pesticidal compositions which comprise an inert carrier and a pesticidally toxic amount of such a compound. Such pesticidal compositions, which can also be called formulations, enable the active compound to be applied conveniently to the site of the pest infestation in any desired quantity. These compositions can be solids such as dusts, granules, pellets or wettable powders; or they can be liquids such as solutions, aerosols or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water and/or oil to any desired concentration of the active compound, can be prepared by incorporating wetting agents into concentrated dust compositions.

Pelletiztd formulations consist of an active compound, a solid inert carrier and a binding agent. Suitable binding agents are hardenable materials such as vinyl chloride vinyl acetate copolymers, hydrocarbon resins, alkyl resins, natural and synthetic drying oils, resin esters, varnishes, phenolic resins, and any of the film forming polymeric materials commonly used in the coatings industry. Pellets are usually prepared by mixing the active compound, the inert carrier and the binding agent, which in most instances is in a solution form, until a paste results. This paste can then be extruded into pellets of any desired size or shape and can then be hardened upon evaporation of the solvent, upon heat curing of the polymeric materials or other methods as required.

Such pelletized formulations often have the advantage of releasing the active ingredients at a controlled rate resulting in better and longer control of aquatic plant life infestations.

In some cases the active compounds are sufficiently soluble in common organic solvents such as kerosene or xylene so that they can be used directly as solutions in these solvents. Frequently, solutions of pesticides can be dispersed under superatmospheric pressure as aerosols. However, preferred liquid pesticidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the pest infestation. The emulsifiable most commonly used in these concentrates are nonionic or mixtures of nonionic with anionic surface-active agents.

The present compounds are useful as aquatic herbicides. They can be applied to the site of the aquatic plant infestation in a manner recognized by the art. One method for the control of aquatic plant life comprises contacting said plant life with a toxic amount of a compound of this invention or a composition which comprises a carrier and an active compound of this invention. Another method for the control of aquatic plant life comprises contacting the water in which said plant life grows with a toxic amount of a compound or composition heretofore described. Yet another method of controlling aquatic plant life comprises treating the soil in which aquatic weeds grow with an above described composition.

Aquatic weeds are undesirable plants which normally start in water and grow at least part of their life cycle in water. These weeds can be classified into submerged weeds, emergent weeds, marginal weeds and floating weeds. Among the submerged weeds are those which primarily spend their life cycle below the surface of the water such as fanwort, water-starwort, coontail, neddlerush, spikerush, elodea, dense waterweed, Western waterweed, waterstargrass, St. Johnswort, waterprimrose, watermilfoil, parrot's feather, naiad, pondweed, wrinkled-leaf pondweed, fine-leaved pondweed, leafy pondweed, American pondweed, sago pondweed, Richardson's pondweed, bladderworts, eelgrass, horned pondweed, whitestem pondweed, giant pondweed, water buttercup, ducksalad and waterplantain. Among the emergent weeds or those aquatic weeds which send stems and leaves above the water surface are watershield, watercress, spatter dock, waterlilies, water parsely, arrow-arum, waterlettuce, white water crowfoot and waterchestnut. Marginal weeds are those aquatic plants which grow at the edge of lakes, ponds, streams, and canals, or in relatively shallow waters. Among this type are cattails, sweetflag, alders, Mexican weed, Oregon sugargrass, sedge, waterwillow, saltgrass, horsetail, rosemallow, pennwort, rushes, cutgrass, lotus, goldenclub, maidencane, paragrass, knotgrass, reedgrass, waterpepper, pickerelweed, marshmarigold, arrowhead, bulrushes, woolgrass, burreed, cordgrass, gooseweed, salt cedar and giant cutgrass. Examples of floating weeds are waterhyacinth, waterfern, alligatorweed, duckweed and watermeals.

The quantity of active compounds required to control aquatic weeds is dependent on a variety of factors such as the hardiness of the particular weed species, methods of application, weather, depth and flow of water, density of phytoplankton, temperature, water hardness, pH, and the like. Generally a rate of from 0.05 to about 50 pounds of active compound per acre of a concentration of about 0.1 to 100 parts per million in the water in which the weeds are growing can be required for good control of aquatic weeds. For example, to control submerged plants in static water, a concentration of only about 5 p.p.m. or less can be sufficient. However, to control the same plants in rapidly moving water, a concentration of up to 100 p.p.m. may be required.

The active compounds of the present invention are also useful when combined with other aquatic herbicides in the compositions heretofore described. These other materials can comprise from about 5 to about 95 percent by weight of the active ingredients in the compositions. Use of combinations of these other aquatic herbicides with the active compounds of this invention often provides compositions which are more effective than separate compositions of the individual compounds.

These other aquatic herbicides with which the active compounds of this invention can be combined include such compounds as copper sulfate, sodium arsenite, acroflavin, acrolein, alum, amitrol, ammonium sulfamate, sodium chlorate, atrazine, benzene hexachloride, CDEA, chlorinated benzene, 2,4-D, dalapon, dichlone, diquat, diuron, DNBP, DNC, DNCHP, 2,3-DNQ, dichloropropionic acid, erbon, fenac, fenuron, ferbam, hexachloroacetone, KPC, potassium permanganate, MCPA maleic hydrazide, monuron, colloidal silver, polychlorobenzoic acid, neuburon, trichloroacetic acid, pentachlorophenol, pyridylmercuric acetate, 2,3-dichloronaphthaquinone, silvex, simazine, 2,4,5-T, TBA, trichloroacetic acid, trichlorobenzene, trichloroethylene, potassium azide, ziram and the like.

The activity of the compounds of the present invention was further demonstrated in an experiment carried out for the control of Sago Pondweed (*Potamogeton pectinatus*), Elodea (*Elodea canadensis*) and common duckweed (*Lemma minor*). In this experimeut the aquatic plants were growing in small plastic pots submerged under eight inches of water. Twenty-one pots each containing one plant were submersed in an 18 inch diameter container. The water was then treated with the test compound formulated as an aqueous dispersion of an acetone solution and held under controlled temperature and lighting conditions for a period of about 21 days. The condition of the aquatic plants was evaluated 8, 15 and 21 days after treatment and reported as the percent control of the test specimens. The results of this experiment are shown in Table I.

TABLE I

| Test compound | Concentration, p.p.m. | Percent control | | |
| --- | --- | --- | --- | --- |
| | | *Elodea canadensis* | *Lemna minor* | *Potamogeton pectinatus* |
| Product of Example: | | | | |
| 1 | 5 | 100 | 100 | 99 |
| 2 | 5 | 100 | 95 | 97 |

We claim:
1. A compound of the formula

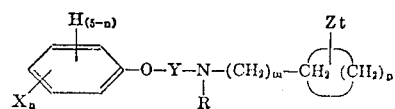

wherein X is selected from the group consisting of alkyl, halogen, haloalkyl, alkoxy, alkylthio and nitro; $n$ is an integer from 0 to 4; Y is an alkylene group of from 1 to 5 carbon atoms; R is monocyanoalkyl; $m$ is an integer from 0 to 3; Z is selected from the group consisting of alkyl and halogen; $t$ is an integer from 0 to 2; and $p$ is an integer from 4 to 11.

2. The compound of claim 1 N-(2-cyanoethyl)-N-cyclohexyl-N-[β-(2,4-dichlorophenoxy)ethyl]amine.

3. The compound of claim 1 N-(2-cyanoethyl)-N-cyclohexyl-N-[β-(2,4-dichlorophenoxy)ethyl]amine.

References Cited
UNITED STATES PATENTS
3,557,209  1/1971  Richter et al. _____ 260—465 X LEWIS GOTTS, Primary Examiner
D. H. TORRENCE, Assistant Examiner U.S. Cl. X.R.
71—66, 105, 121; 260—570.7; 424—304, 330